(12) United States Patent
Sipp et al.

(10) Patent No.: US 9,326,529 B2
(45) Date of Patent: May 3, 2016

(54) BEVERAGE DISPENSER FOR PARTIALLY FROZEN BEVERAGES WITH AN IMPROVED DRIVE AND SEALING SYSTEM

(71) Applicant: Grindmaster Corporation, Louisville, KY (US)

(72) Inventors: Richard Leon Sipp, Crestwood, KY (US); Curry Joseph Cates, Louisville, KY (US); Jose G. Avendano, Louisville, KY (US)

(73) Assignee: Grindmaster Corporation, Louisville, KY (US)

( * ) Notice: Subject to any disclaimer, the term of this patent is extended or adjusted under 35 U.S.C. 154(b) by 0 days.

(21) Appl. No.: 14/705,394

(22) Filed: May 6, 2015

(65) Prior Publication Data

US 2015/0230496 A1    Aug. 20, 2015

Related U.S. Application Data (63) Continuation of application No. 13/964,452, filed on Aug. 12, 2013, now Pat. No. 9,060,527, which is a continuation-in-part of application No. 13/223,639, filed on Sep. 1, 2011, now abandoned.

(60) Provisional application No. 61/379,813, filed on Sep. 3, 2010.

(51) Int. Cl.

| *A23G 9/00* | (2006.01) |
|---|---|
| *A23G 9/04* | (2006.01) |
| *A23G 9/22* | (2006.01) |
| *A23G 9/12* | (2006.01) |
| *A23G 9/16* | (2006.01) |
| *A23G 9/18* | (2006.01) |

(52) U.S. Cl.
CPC *A23G 9/045* (2013.01); *A23G 9/04* (2013.01); *A23G 9/224* (2013.01); *A23G 9/228* (2013.01); *A23G 9/12* (2013.01); *A23G 9/16* (2013.01); *A23G 9/18* (2013.01)

(58) Field of Classification Search
CPC .......... A23G 9/045; A23G 9/16; A23G 9/18; A23G 9/224
USPC ................................ 62/1, 342–343, 345, 354
See application file for complete search history.

(56) References Cited

U.S. PATENT DOCUMENTS

| 4,913,280 A * | 4/1990 | Whyman | B65G 33/265 198/659 |
|---|---|---|---|
| 6,460,368 B1 * | 10/2002 | Grande Damaso | A23G 9/045 366/273 |

(Continued)

OTHER PUBLICATIONS

Mexican Institute of Intellectual Property, Office Action, issued in corresponding Application No. MX/a/2013/002442, mailed Oct. 22, 2015.

*Primary Examiner* — Frantz Jules
*Assistant Examiner* — Steve Tanenbaum
(74) *Attorney, Agent, or Firm* — Stites & Harbison, PLLC; David W. Nagle, Jr.; James R. Hayne (57) ABSTRACT

A beverage dispenser for partially frozen beverages includes at least one bowl for storing a beverage product, with a freezing cylinder positioned in the bowl. The beverage dispenser further includes a cooling system for supplying a cooling medium to the freezing cylinder to cool the beverage product when stored in the bowl, along with a dispenser assembly for dispensing the beverage product from the bowl. The beverage dispenser includes an auger which rotates about the freezing cylinder. A driven hub is positioned on and rotates with respect to the freezing cylinder, and the driven hub engages a rear end portion of the auger. A driver hub is positioned inside of the freezing cylinder and is magnetically coupled to the driven hub, such that rotation of the driver hub causes a corresponding rotation of the driven hub, and thus, rotation of the auger.

12 Claims, 10 Drawing Sheets

(56) References Cited

U.S. PATENT DOCUMENTS 7,762,097 B2 * 7/2010 Jeong .................. F25C 5/005
62/340
9,060,527 B2 * 6/2015 Sipp .................. A23G 9/04
2008/0092580 A1 * 4/2008 Mavridis .............. A23G 9/045
62/342
2008/0098765 A1 * 5/2008 Bond .................. A23G 9/045
62/342

* cited by examiner

BEVERAGE DISPENSER FOR PARTIALLY FROZEN BEVERAGES WITH AN IMPROVED DRIVE AND SEALING SYSTEM

CROSS-REFERENCE TO RELATED APPLICATIONS

The present application is a continuation of U.S. patent application Ser. No. 13/964,452 filed on Aug. 12, 2013, which is a continuation-in-part of U.S. patent application Ser. No. 13/223,639 filed on Sep. 1, 2011, which claims priority to U.S. Provisional Patent Application Ser. No. 61/379,813 filed on Sep. 3, 2010, the entire disclosures of which is incorporated herein by reference.

BACKGROUND OF THE INVENTION

The present invention relates to a beverage dispenser, and, more particularly, to a beverage dispenser for partially frozen beverages with an improved drive and sealing system.

In the food service industry, various machines have been developed to produce, store, and dispense a partially frozen beverage, such as a slush-type beverage. In general, such machines mix water and a flavored component, freeze the mixture, and then dispense a partially frozen beverage product with a slush-like consistency. Such machines are often referred to as "granita" machines.

In general, such a granita machine includes a bowl for storing the beverage product. A freezing cylinder extends through the bowl and houses evaporator coils (of a refrigeration circuit) or other refrigeration means that cools the beverage product to the desired temperature. Also located within the bowl is an auger which rotates about the freezing cylinder to shave frozen beverage product off of the surface of the freezing cylinder and to circulate the beverage product within the bowl, resulting in the partially frozen or slush-like consistency of the beverage product.

Figure 1:
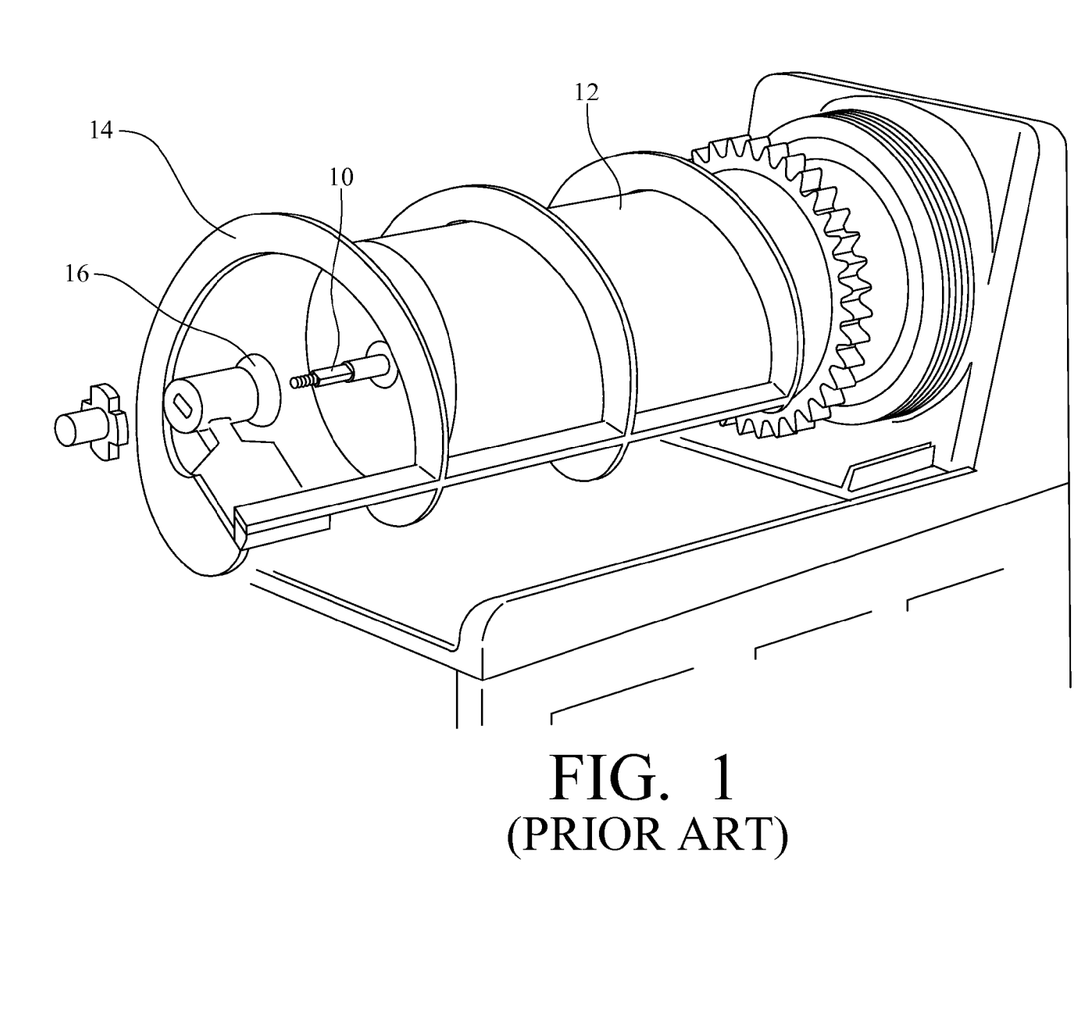
FIG. 1 is a perspective view of the freezing cylinder, drive shaft, and auger in a prior art construction of a beverage dispenser.

In most prior art constructions, a granita machine includes a drive shaft that extends through the center of the freezing cylinder and is connected to the auger. At the rear of the granita machine, this drive shaft is operably connected to a gear arrangement and motor. For example, as shown in FIG. 1, the drive shaft 10 extends through the freezing cylinder 12, and, at the front end of freezing cylinder 12, the drive shaft 10 is connected to and drives the auger 14. Thus, such a construction requires a shaft seal 16 at the front end of the freezing cylinder 14. This shaft seal 16 is almost continuously submerged in the partially frozen beverage product and can be prone to leakage, allowing the beverage product to seep into the interior of the freezing cylinder 12. Once the partially frozen beverage product, which typically includes high amounts or sugar and is very sticky, gets into the interior of the freezing cylinder 12, it can be virtually impossible to clean it out of the freezing cylinder 12.

Commonly owned U.S. patent application Ser. No. 13/223,639 (U.S. Patent Publication No. 2012/0055189) thus describes and claims a beverage dispenser for partially frozen beverages with an improved drive and sealing system. The beverage dispenser includes one or more bowls. In each bowl, there is a freezing cylinder, and there is a dispenser assembly at the front end of each bowl for dispensing the beverage product. In each bowl, there is also an auger which rotates about each freezing cylinder to shave frozen beverage product off of the surface of the freezing cylinder and to circulate the beverage product within the respective bowls, resulting in the partially frozen or slush-like consistency of the beverage product.

The auger in such a beverage dispenser is preferably a unitary member molded from a thermoplastic material. The auger preferably includes a helical flange (or flight) that is reinforced by first and second longitudinal ribs that extend the length of the auger. At one end, the helical flange terminates in a cylindrical member that defines an internal cavity. The freezing cylinder includes a boss extending from its front surface that is received in the internal cavity defined by the cylindrical member. Thus, once assembled, the position of the auger relative to the freezing cylinder is maintained, in part, by the connection of the cylindrical member of the auger to the boss extending from the front surface of the freezing cylinder; however, the auger is still free to rotate relative to the freezing cylinder.

In each bowl, the auger is driven from the rear, and thus, there is no drive shaft that extends through the freezing cylinder. Thus, there is no shaft seal in the lower front portion of the dispenser, where it would be continuously submerged in the partially frozen beverage product.

While the beverage dispenser described and claimed in U.S. patent application Ser. No. 13/223,639 (U.S. Patent Publication No. 2012/0055189) does address some of the deficiencies of the prior art, in some applications, alternative drive systems for rotating the auger may be desirable.

SUMMARY OF THE INVENTION

The present invention is a beverage dispenser for partially frozen beverages with an improved drive and sealing system.

In a beverage dispenser made in accordance with the present invention, the beverage dispenser includes one or more bowls. In each bowl, there is a freezing cylinder, and there is a dispenser assembly at the front end of each bowl for dispensing the beverage product. In each bowl, there is also an auger which rotates about each freezing cylinder to shave frozen beverage product off of the surface of the freezing cylinder and to circulate the beverage product within the bowl, resulting in the partially frozen or slush-like consistency of the beverage product.

An exemplary auger for use in a beverage dispenser made in accordance with the present invention is preferably a unitary member molded from a thermoplastic material. The auger preferably includes a helical flange (or flight) that is reinforced by first and second longitudinal ribs that extend the length of the auger. At one end, the helical flange terminates in a cylindrical member that defines an internal cavity. The freezing cylinder includes a boss extending from its front surface that is received in the internal cavity defined by the cylindrical member. Thus, once assembled, the position of the auger relative to the freezing cylinder is maintained, in part, by the connection of the cylindrical member of the auger to the boss extending from the front surface of the freezing cylinder; however, the auger is still free to rotate relative to the freezing cylinder.

In each bowl, the auger is driven from the rear, and thus, there is no drive shaft that extends through the freezing cylinder. In this regard, the auger defines a rear end portion at its second end, which, when assembled, is positioned near the rear of the beverage dispenser. The rear end portion defines an internal cavity with a generally cylindrical volume. In one exemplary embodiment, multiple teeth extend from the wall surface of this internal cavity.

The rear end portion of the auger is engaged by a driven hub. In one exemplary embodiment, the driven hub is an annular structure that defines alternating cogs and pockets along its periphery. Once assembled, the multiple teeth that extend from the wall surface of the internal cavity in the rear end portion of the auger extend into the pockets. Thus, as the driven hub is rotated, the auger is rotated.

The driven hub is positioned on and rotates around the freezing cylinder. The driven hub is magnetically coupled to a driver hub that is positioned inside of the freezing cylinder. The driver hub is operably connected to a motor, so once the motor is activated, the driver hub begins rotating. The magnetic coupling of the driven hub and the driver hub thus causes rotation of the driven hub, which, in turn, causes rotation of the auger.

Again, in such a construction, there is no drive shaft that extends through a freezing cylinder, and therefore, there is no shaft seal in the lower front portion of the dispenser, where it would be continuously submerged in the partially frozen beverage product. Accordingly, the beverage dispenser of the present invention eliminates the attendant problems of leakage at a front shaft seal as is common in prior art constructions.

As an additional benefit, cleaning of the components is much easier as compared to prior art constructions as a bowl and associated auger can be readily pulled forward and removed from the dispenser and taken to a wash area for cleaning.

DETAILED DESCRIPTION OF THE INVENTION

The present invention is a beverage dispenser for partially frozen beverages with an improved drive and sealing system.

Figure 2:
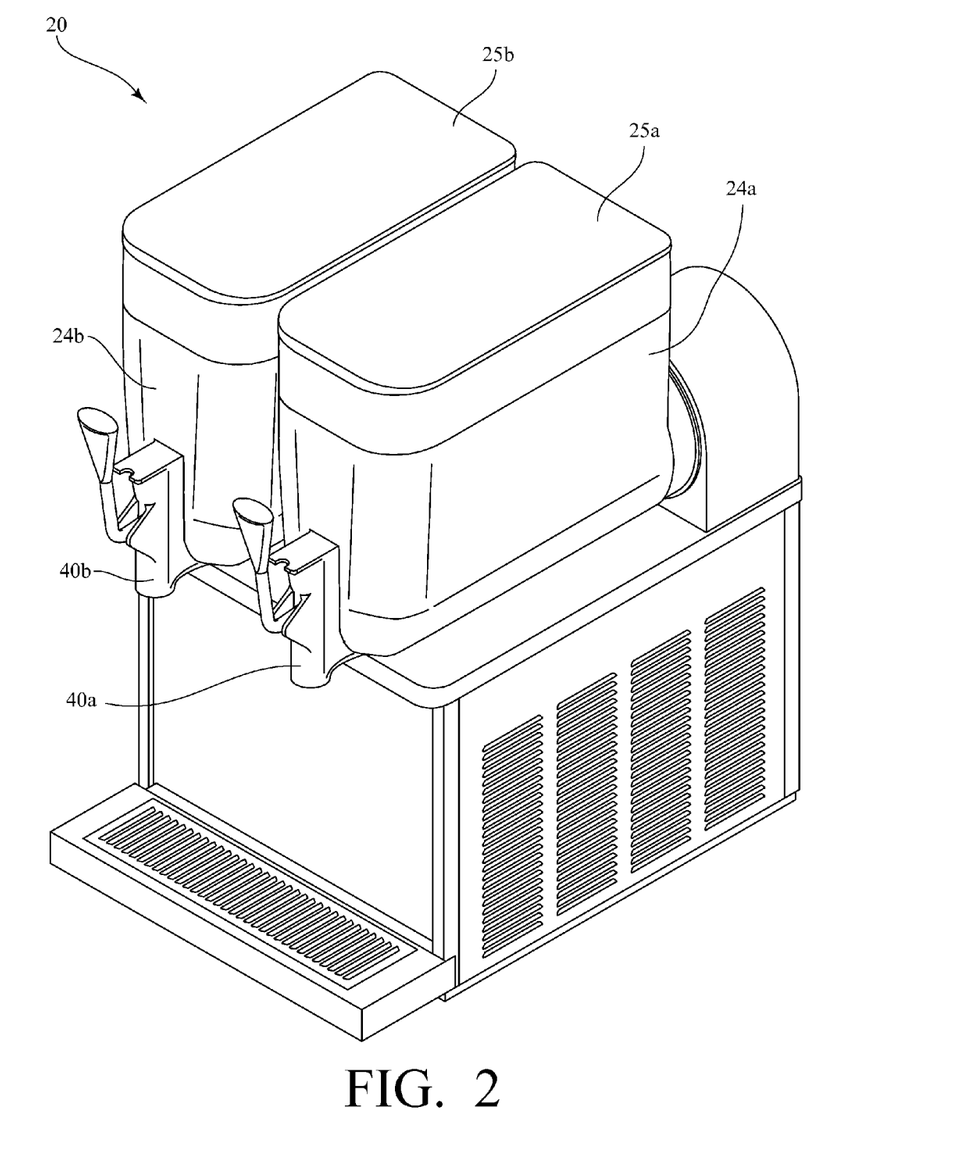
FIG. 2 is a perspective view of an exemplary beverage dispenser made in accordance with the present invention.

FIG. 2 is a perspective view of an exemplary beverage dispenser made in accordance with the present invention. The exemplary beverage dispenser 20 has two separate bowls 24a, 24b with lids 25a, 25b, and there is a dispenser assembly 40a, 40b at the front end of each bowl 24a, 24b for dispensing the beverage product. However, it should be recognized that a beverage dispenser made in accordance with the present invention could have any number of bowls and associated dispensing assemblies without departing from the spirit and scope of the present invention.

Figure 3:
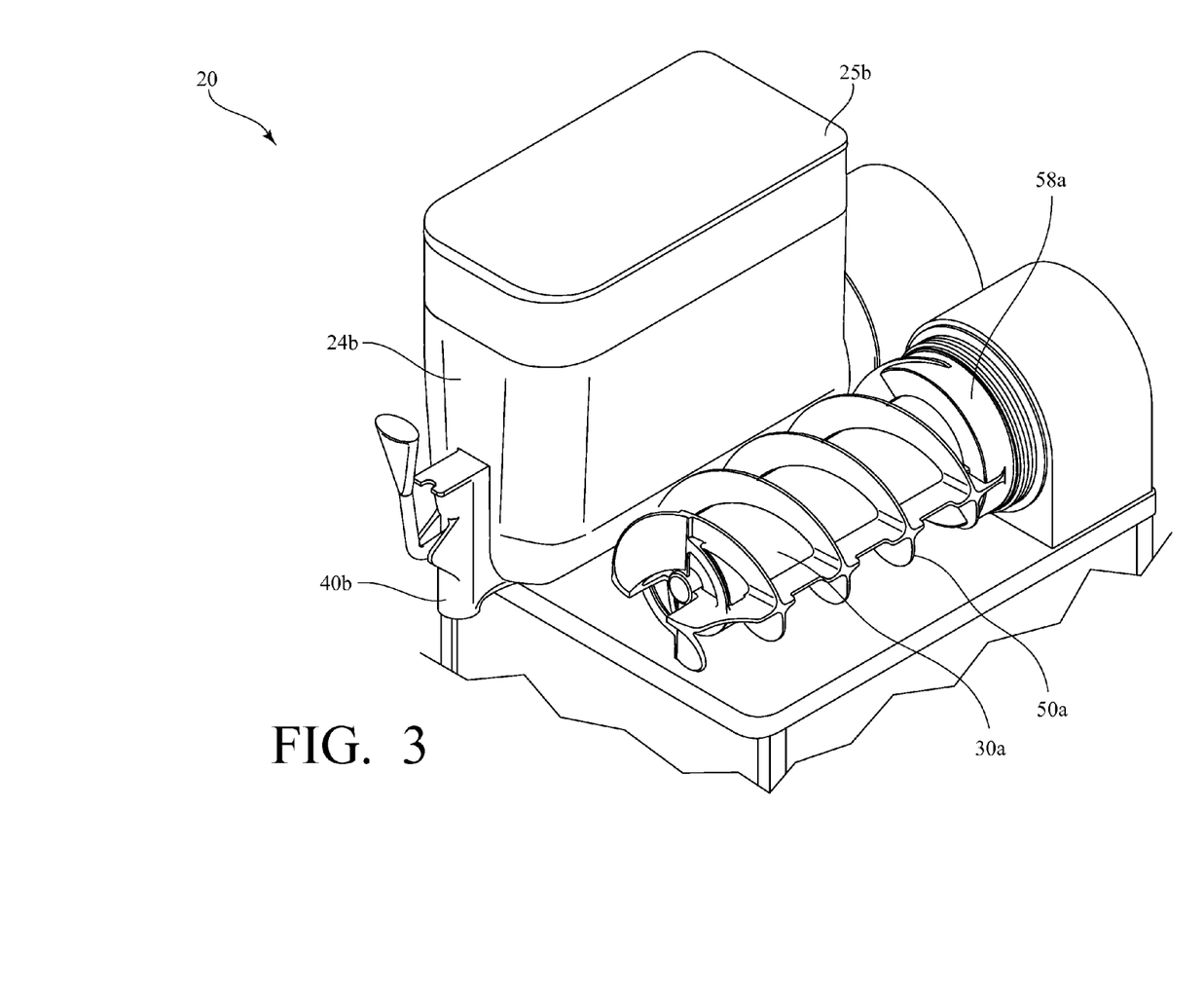
FIG. 3 is a partial perspective view of the exemplary beverage dispenser of FIG. 2, but with one bowl hidden from view to better illustrate the freezing cylinder, auger, and other internal components.
Figure 4:
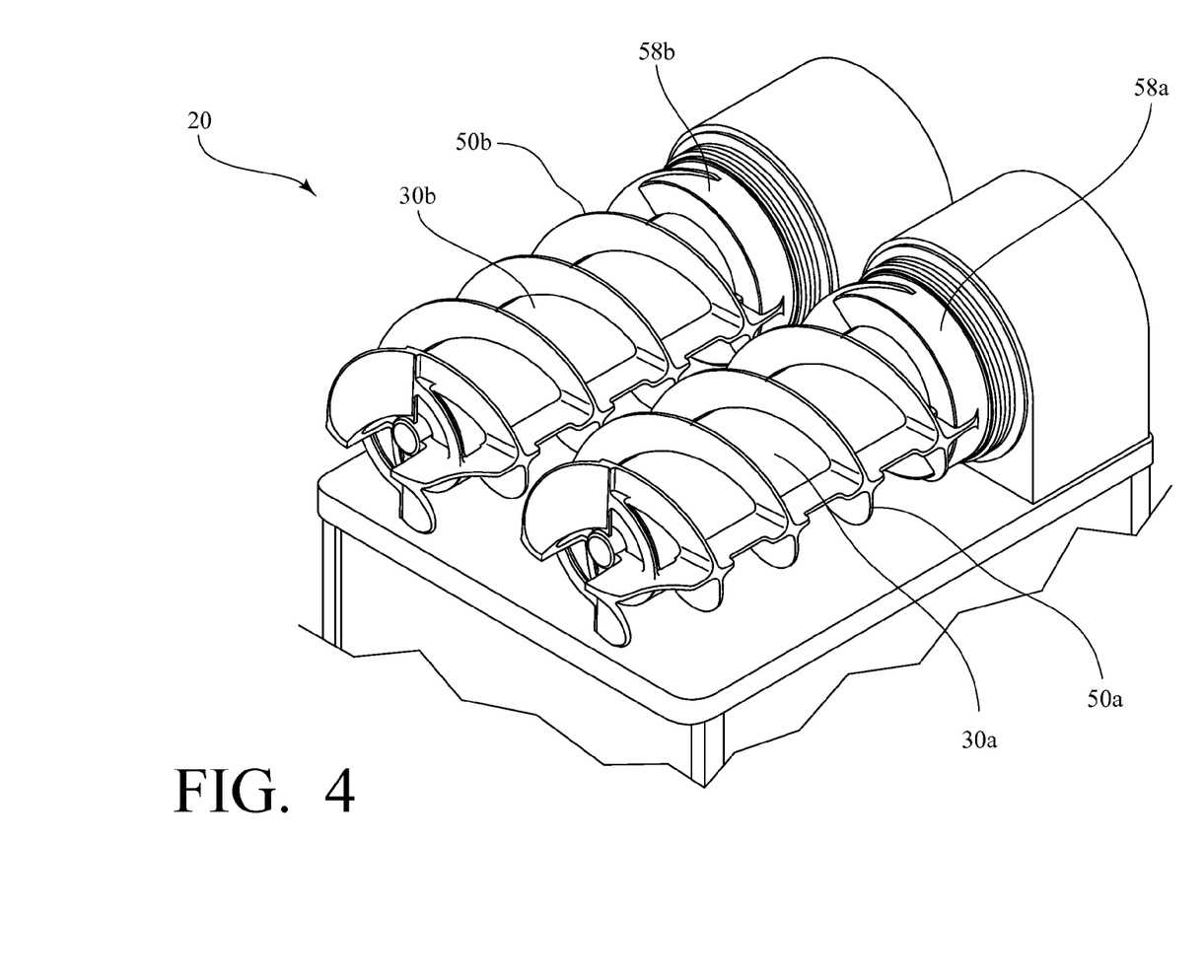
FIG. 4 is another partial perspective view of the exemplary beverage dispenser of FIG. 2, but with both bowls hidden from view to better illustrate the freezing cylinders, augers, and other internal components.

FIG. 3 is a partial perspective view of the same exemplary beverage dispenser 20, but with one bowl 24a hidden from view to better illustrate some of the internal components of the beverage dispenser 20. FIG. 4 is another partial perspective view of the exemplary beverage dispenser 20 of FIG. 2, but with both bowls 24a, 24b hidden from view to better illustrate some of the internal components of the beverage dispenser 20.

As shown in FIGS. 3 and 4, in this exemplary beverage dispenser 20, in each bowl 24a, 24b, there is a freezing cylinder 30a, 30b, which, as mentioned above, is typical of prior art constructions. As is also typical in prior art constructions, in each bowl 24a, 24b, there is an auger 50a, 50b which rotates about the respective freezing cylinder 30a, 30b to shave frozen beverage product off of the surface of the freezing cylinder 30a, 30b and to circulate the beverage product within the respective bowls 24a, 24b, resulting in the partially frozen or slush-like consistency of the beverage product.

Figure 6:
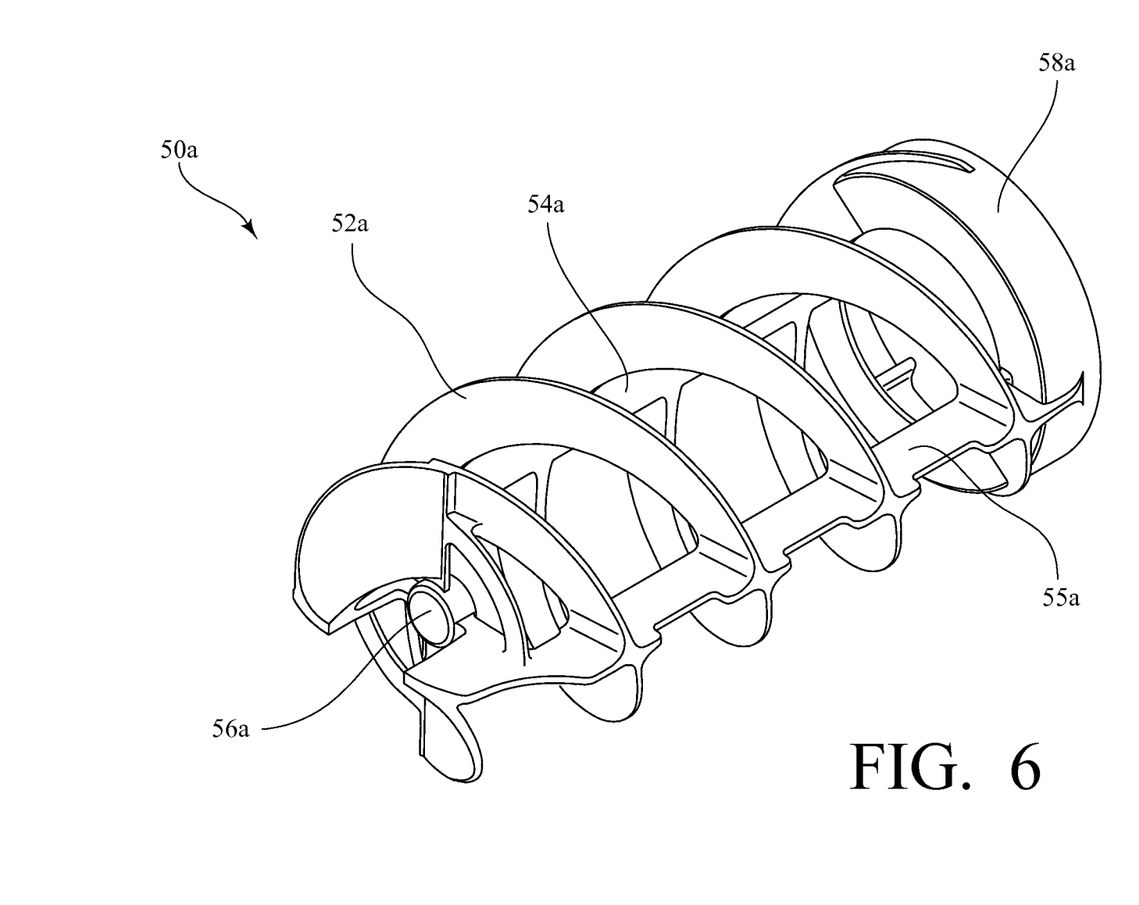
FIG. 6 is a perspective view of one of the augers of the exemplary beverage dispenser of FIG. 2.
Figure 7:
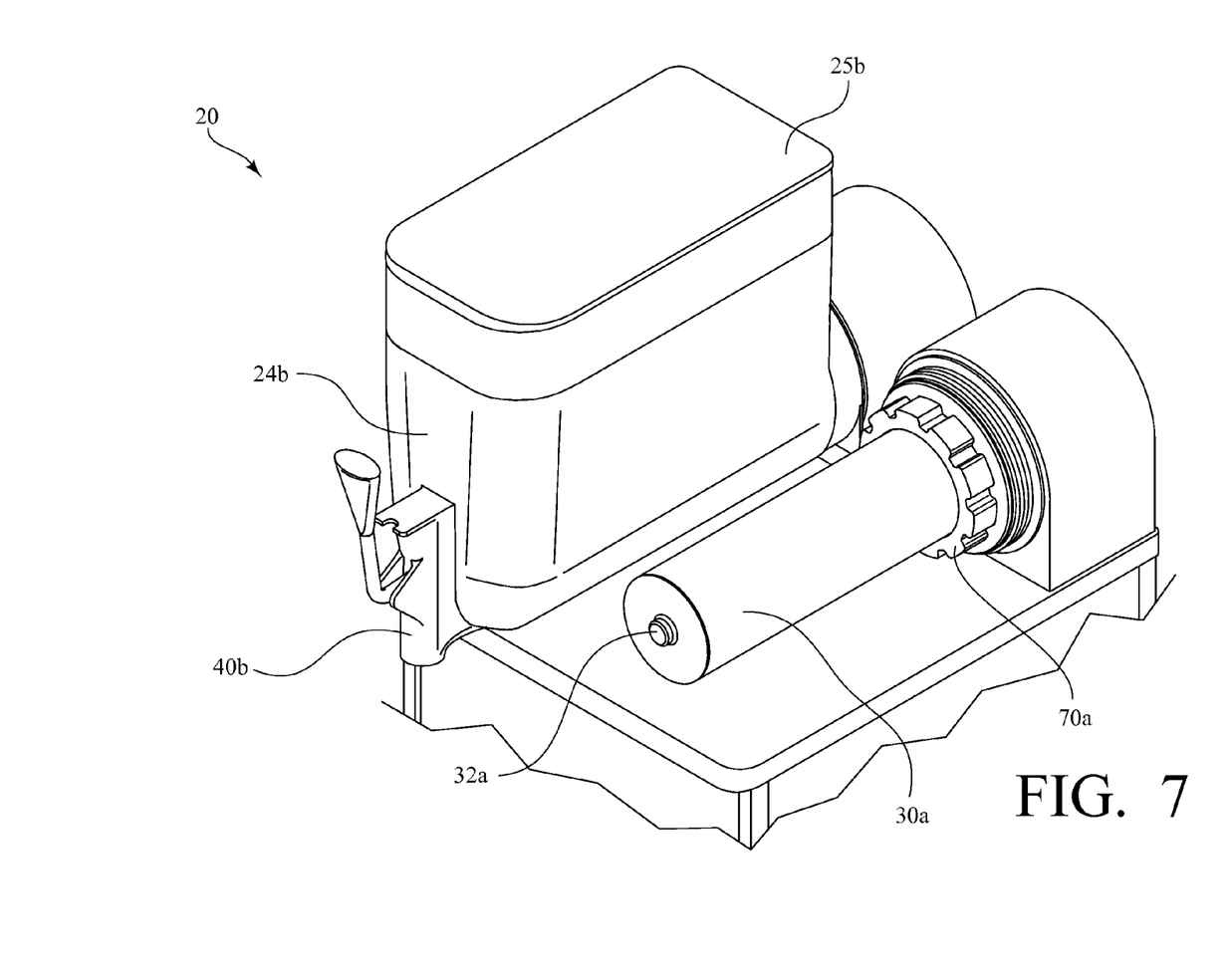
FIG. 7 is a partial perspective view of the exemplary beverage dispenser similar to FIG. 3, but with the auger hidden from view to better illustrate the freezing cylinder and the driven hub.

FIG. 6 is a perspective view of one of the augers 50a of the exemplary beverage dispenser 20, and FIG. 7 is a partial perspective view of the exemplary beverage dispenser 20 that perhaps best illustrates the freezing cylinder 30a.

As shown in FIG. 6, the auger 50a is preferably a unitary member and molded from a thermoplastic material. The auger 50a includes a helical flange (or flight) 52a that is reinforced by first and second longitudinal ribs 54a, 55a that extend the length of the auger 50a. At one end, the helical flange 52a terminates in a cylindrical member 56a that defines an internal cavity. As shown in FIG. 7, the freezing cylinder 30a includes a boss 32a extending from its front surface that is received in the internal cavity defined by the cylindrical member 56a. Thus, once assembled, the position of the auger 50a relative to the freezing cylinder 30a is maintained, in part, by the connection of the cylindrical member 56a of the auger 50a to the boss 32a extending from the front surface of the freezing cylinder 30a; however, the auger 50a is still free to rotate relative to the freezing cylinder 30a.

Figure 9:
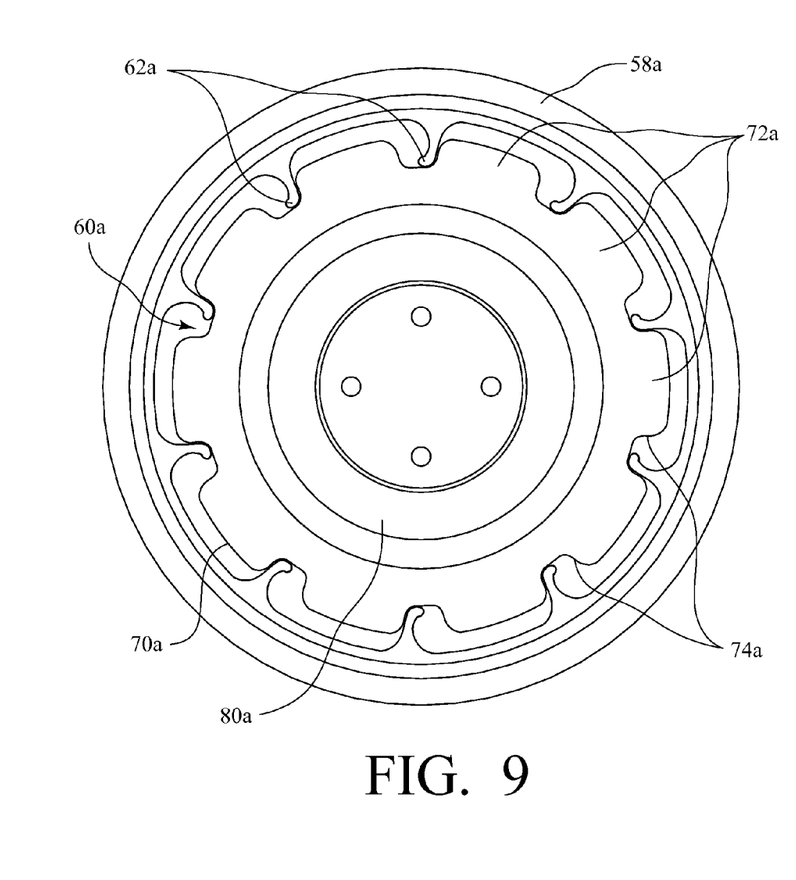
FIG. 9 is an end view of one auger, a driver hub, and a driven hub of the exemplary beverage dispenser of FIG. 2.

In each bowl 24a, 24b, the auger 50a, 50b is driven from the rear, and thus, there is no drive shaft that extends through the respective freezing cylinders 30a, 30b. Specifically, as shown in FIGS. 3-6, each auger 50a, 50b is formed with an integral rear end portion 58a, 58b at its second end, which, when assembled, is positioned near the rear of the beverage dispenser 20. Referring now to FIG. 9, each rear end portion 58a defines an internal cavity 60a with a generally cylindrical volume. Furthermore, in this exemplary embodiment, multiple teeth 62a are molded into and extend from the wall surface of this internal cavity 60a, the importance of which is further described below.

Referring still to FIG. 9, the rear end portion 58a of the auger 50a is engaged by a driven hub 70a, which is an annular structure that defines alternating cogs 72a and pockets 74a along the periphery of the driven hub 70a. As shown in FIG. 9, once assembled, the multiple teeth 62a that extend from the wall surface of the internal cavity 60a in the rear end portion 58a of the auger 50a extend into the pockets 74a defined along the periphery of the driven hub 70a. Thus, as the driven hub 70a is rotated, the auger 50a is rotated.

Figure 8:
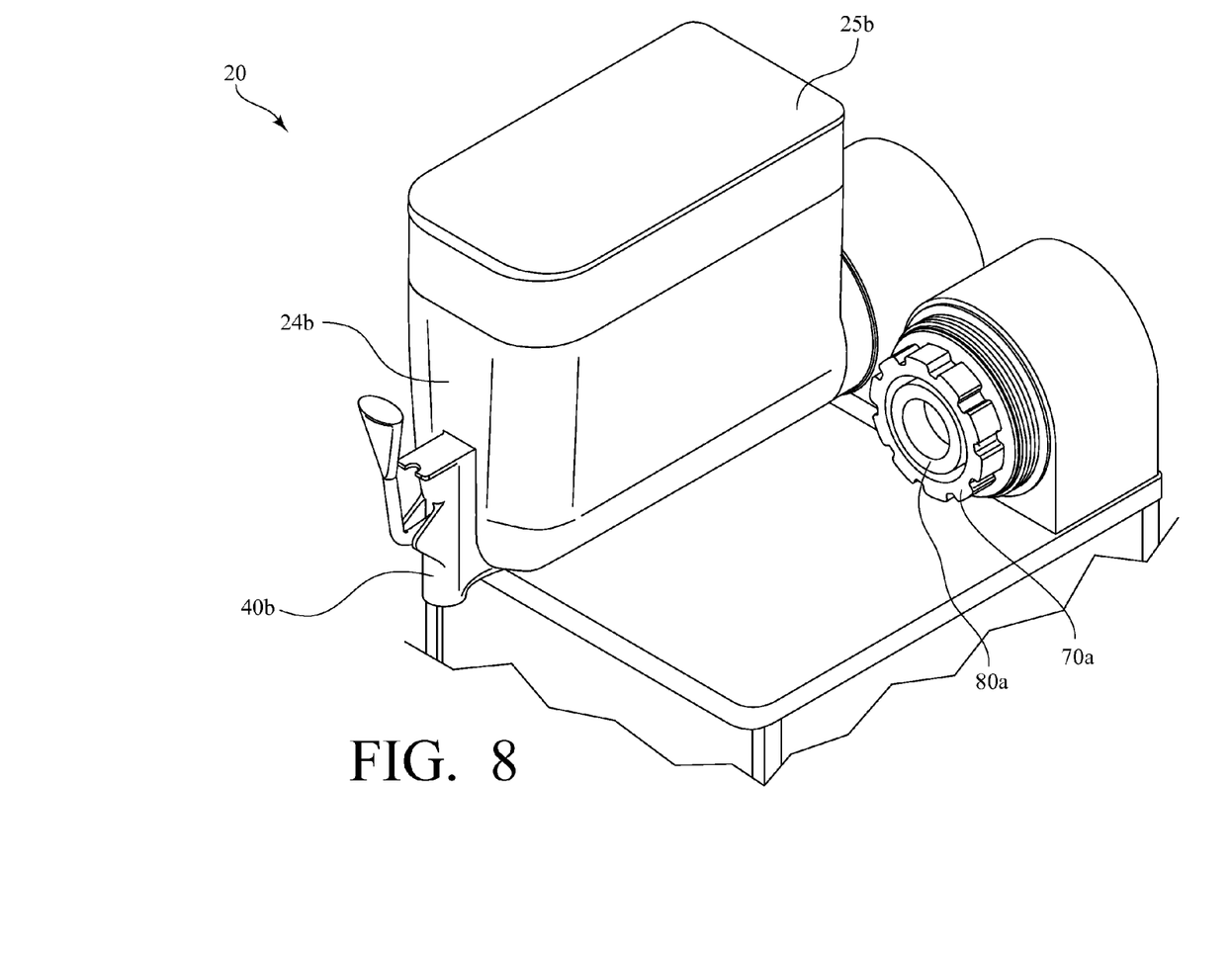
FIG. 8 is a partial perspective view of the exemplary beverage dispenser similar to FIG. 7, but with the auger and the freezing cylinder hidden from view to illustrate the relationship between the driver hub and the driven hub.
Figure 10:
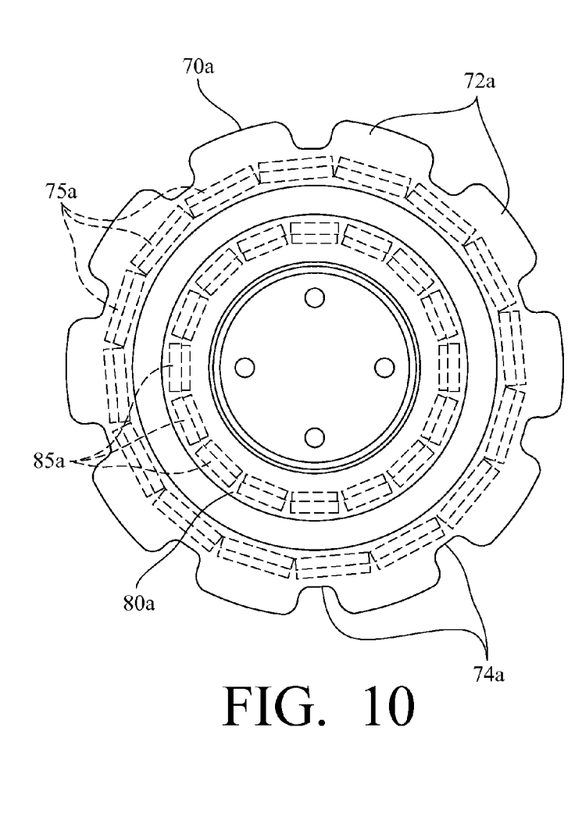
FIG. 10 is an end view of the driver hub and the driven hub of FIG. 9, with the respective magnets of the driver hub and the driven hub shown in phantom.

Referring now to FIG. 7, where the auger 50a has been hidden from view, the driven hub 70a is positioned on and rotates around the freezing cylinder 30a. Referring now to FIG. 8, where the auger 50a and the freezing cylinder 30a have been hidden from view, along with the sectional view of FIG. 5, the driven hub 70a is magnetically coupled to a driver hub 80a that is positioned inside of the freezing cylinder 30a. With respect to the magnetic coupling of the driven hub 70a and the driver hub 80a, and as shown in FIG. 10, a plurality of magnets 75a is housed within the driven hub 70a, and a corresponding plurality of magnets 85a is housed within the driver hub 80a. In this exemplary embodiment, each of the driven hub 70a and the driver hub 80a houses sixteen magnets that face and engage each other through the wall of the freezing cylinder 30a. In any event, as a result of the magnetic coupling, rotation of the driver hub 80a causes a corresponding rotation of the driven hub 70a.

Figure 5:
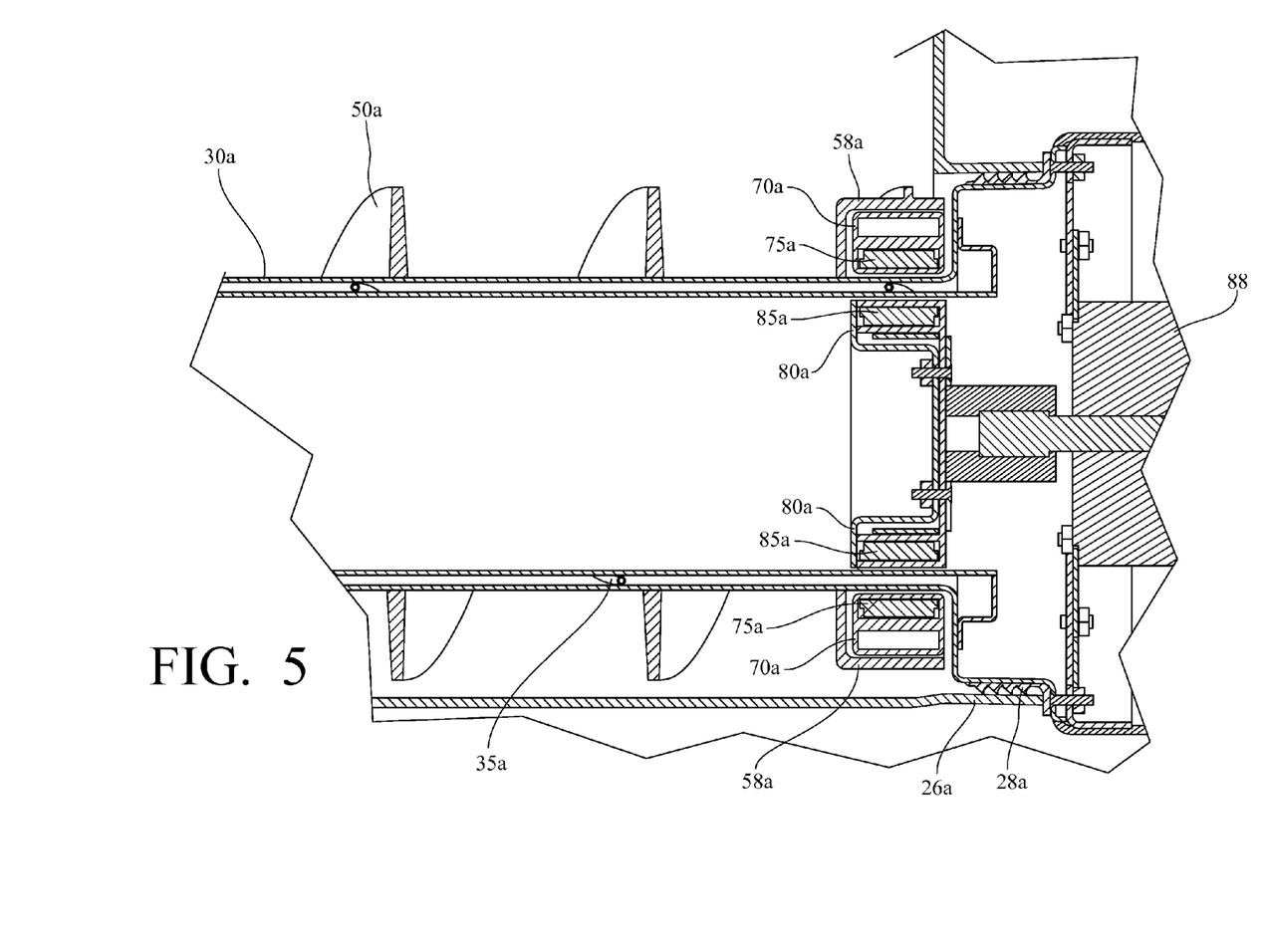
FIG. 5 is an sectional view of the exemplary beverage dispenser of FIG. 2, illustrating the relationship between the freezing cylinder, auger, the driven hub, and the driver hub.

Returning to the sectional view of FIG. 5, the driver hub 80a is operably connected to the motor 88, so once the motor 88 is activated, the driver hub 80a begins rotating. The magnetic coupling of the driven hub 70a and the driver hub 80a thus causes rotation of the driven hub 70a, which, in turn, causes rotation of the auger 50a. However, it should be recognized that because there is only a magnetic coupling between the driven hub 70a and the driver hub 80a, as opposed to a mechanical coupling, if over-frozen beverage product or another obstacle impedes rotation of the auger 50a, the magnetic coupling will "break" before the motor 88 is overloaded.

As mentioned above, in such a construction, there is no drive shaft that extends through the respective freezing cylinders 30a, 30b, and therefore, there is no shaft seal in the lower front portion of the beverage dispenser 20, where it would be continuously submerged in the partially frozen beverage product. Accordingly, the beverage dispenser 20 of the present invention eliminates the attendant problems of leakage at a front shaft seal as is common in prior art constructions.

As an additional benefit, in such a construction, cleaning of the components is much easier as compared to prior art constructions as each bowl 24a, 24b and each auger 50a, 50b can be readily pulled forward and removed from the beverage dispenser 20 and taken to a wash area for cleaning. Specifically, and as shown in the sectional view of FIG. 5, in assembling the beverage dispenser 20, the auger 50a simply slips over the freezing cylinder until it engages the driven hub 70a. Similarly, the bowl 24a has a circular rear opening that allows it to be similarly slipped over the freezing cylinder 30a and the auger 50, until a lip 26a that circumscribes the rear opening contacts and engages a sealing gasket 28a.

Figure 11:
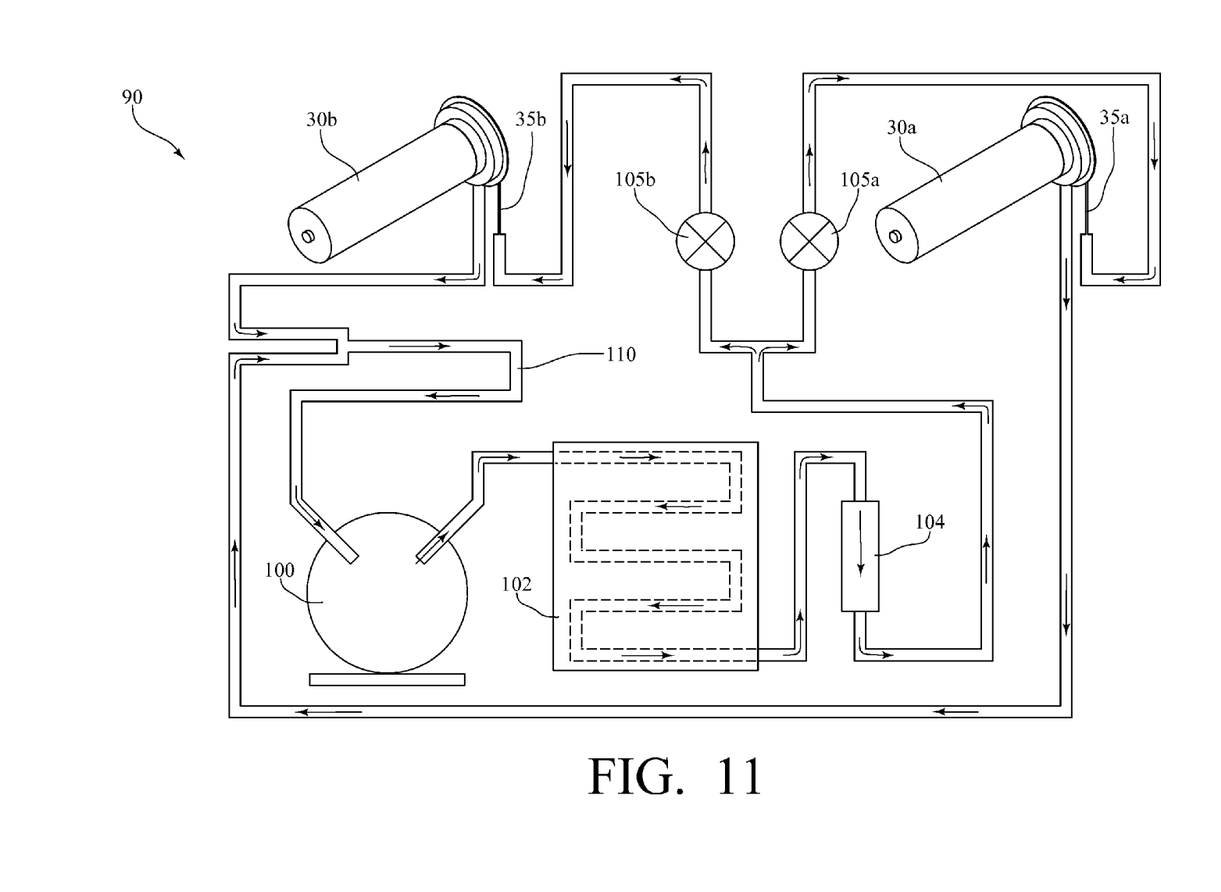
FIG. 11 is a schematic view of the cooling system in the exemplary beverage dispenser of FIG. 2.

Finally, it should be recognized that an exemplary beverage dispenser made in accordance with the present invention would include a typical cooling system to produce the necessary refrigeration circuit. In this exemplary embodiment, a flooded evaporator approach is used. Specifically, and as shown in FIG. 5, each freezing cylinder 30a, 30b has a double-walled construction, such that a cooling medium can flow in the space between the walls. The cooling medium is delivered into this space by a capillary tube 35a, 35b associated with each freezing cylinder 30a, 30b. The capillary tubes 35a, 35b are in fluid communication with certain cooling components housed in a lower portion of the beverage dispenser 20. For example, as shown in the schematic view of FIG. 11, the components of the cooling system 90 may include a compressor 100, a condenser 102, a filter/dryer 104, the above-described capillary tubes 35a, 35b (or other refrigerant control device), and a suction line 110. As is common in such cooling systems, the compressor 100 compresses the cooling medium, preferably a refrigerant gas such as R404a (a commercially available hydrofluorocarbon refrigerant), to raise the temperature and stored energy of the cooling medium. Therefore, the cooling medium exits the compressor 100 and enters the condenser 102 as a hot, high pressure gas. In the condenser 102, the heat from the pressurization of the cooling medium is dissipated, and the cooling medium reverts to a liquid form, but remains at a high pressure. The cooling medium then passes through a filter drier 104, which is designed to filter out contaminants and dry the cooling medium to prevent ice formation. As it exits the filter drier 104, the cooling medium is separated into two streams, one associated with each freezing cylinder 30a, 30b. In each case, the cooling medium passes through to the respective capillary tube 35a, 35b associated with each freezing cylinder 30a, 30b. In this exemplary embodiment, such flow into each capillary tube 35a, 35b is controlled by a solenoid valve 105a, 105b. In any event, each capillary tube 35a, 35b serves as a pressure-reducing device and meters the cooling medium into the space between the walls of the respective freezing cylinders 30a, 30b. Because of the pressure drop, the cooling medium evaporates, absorbing heat as it does so. By the time the cooling medium exits the freezing cylinders 30a, 30b, returning to the compressor 100 through a suction line 110, it again is a cool, low-pressure gas.

One of ordinary skill in the art will also recognize that additional embodiments are possible without departing from the teachings of the present invention. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A beverage dispenser for partially frozen beverages, comprising:
    at least one bowl for storing a beverage product;
    a freezing cylinder positioned in the bowl and defining a side wall;
    a cooling system for supplying a cooling medium to the freezing cylinder to cool the beverage product when stored in the bowl;
    a dispenser assembly for dispensing the beverage product from the bowl near a front of the beverage dispenser;
    an auger which rotates about the freezing cylinder, the auger including a first end positioned near the front of the beverage dispenser and a second end positioned near a rear of the beverage dispenser, and the auger defining a rear end portion at the second end of the auger, with the rear end portion of the auger defining an internal cavity;
    a driven hub that is positioned on and adjacent an external surface of the side wall of the freezing cylinder and rotates around the freezing cylinder, the driven hub being received in the internal cavity defined by the rear end portion of the auger and engaging the rear end portion of the auger; and
    a driver hub that is positioned inside of the freezing cylinder in a substantially concentric relationship with the driven hub, wherein the driver hub is magnetically coupled to the driven hub through the side wall of the freezing cylinder, such that rotation of the driver hub causes a corresponding rotation of the driven hub;
    wherein the auger and the driven hub are configured to slide along the length of the freezing cylinder, thus facilitating the removal of the auger and the driven hub from the freezing cylinder.

2. The beverage dispenser as recited in claim 1, wherein the driver hub is operably connected to a motor.

3. The beverage dispenser as recited in claim 1, wherein the rear end portion of the auger includes multiple teeth extending from a wall surface of the internal cavity for engaging the driven hub.

4. The beverage dispenser as recited in claim 3, wherein the driven hub defines alternating cogs and pockets along its periphery, such that the multiple teeth that extend from the wall surface of the internal cavity in the rear end portion of the auger extend into the pockets.

5. The beverage dispenser as recited in claim 1, wherein the auger is a unitary member.

6. The beverage dispenser as recited in claim 5, wherein the auger is molded from a thermoplastic material.

7. The beverage dispenser as recited in claim 1, wherein the auger includes a helical flange.

8. The beverage dispenser as recited in claim 7, wherein the auger further includes at least two longitudinal ribs that extend the length of the auger.

9. The beverage dispenser as recited in claim 8, wherein, at the first end of the auger, the helical flange terminates in a cylindrical member that defines an internal cavity for receiving a boss extending from a front surface of the freezing cylinder.

10. A beverage dispenser for partially frozen beverages, comprising:
    a first bowl for storing a first beverage product;
    a first freezing cylinder positioned in the first bowl and defining a side wall;
    a first auger which rotates about the first freezing cylinder, the first auger including one end positioned near a front of the beverage dispenser and another end positioned near a rear of the beverage dispenser, and the first auger defining a rear end portion at the end of the first auger positioned near the rear of the beverage dispenser, with the rear end portion of the first auger defining an internal cavity;
    a first driven hub that is positioned on and adjacent an external surface of the side wall of the first freezing cylinder and rotates around the first freezing cylinder, the first driven hub being received in the internal cavity defined by the rear end portion of the first auger and engaging the rear end portion of the first auger, and
    a first driver hub that is positioned inside of the first freezing cylinder in a substantially concentric relationship with the first driven hub, wherein the first driver hub is magnetically coupled to the first driven hub through the side wall of the first freezing cylinder, such that rotation of the first driver hub causes a corresponding rotation of the first driven hub;
    a first dispenser assembly for dispensing the first beverage product from the first bowl near the front of the beverage dispenser,
    a second bowl for storing a second beverage product;
    a second freezing cylinder positioned in the second bowl and defining a side wall;
    a second auger which rotates about the second freezing cylinder, the second auger including one end positioned near a front of the beverage dispenser and another end positioned near a rear of the beverage dispenser, and the second auger defining a rear end portion at the end of the second auger positioned near the rear of the beverage dispenser, with the rear end portion of the second auger defining an internal cavity;
    a second driven hub that is positioned on and adjacent an external surface of the side wall of the second freezing cylinder and rotates around the second freezing cylinder, the second driven hub being received in the internal cavity defined by the rear end portion of the second auger and engaging the rear end portion of the second auger; and
    a second driver hub that is positioned inside of the second freezing cylinder in a substantially concentric relationship with the second driven hub, wherein the second driver hub is magnetically coupled to the second driven hub through the side wall of the second freezing cylinder, such that rotation of the second driver hub causes a corresponding rotation of the second driven hub;
    a second dispenser assembly for dispensing the second beverage product from the second bowl near the front of the beverage dispenser, and
    a cooling system for supplying a cooling medium to the first freezing cylinder and the second freezing cylinder to cool the first beverage product stored in the first bowl and the second beverage product stored in the second bowl;
    wherein the first auger and the first driven hub are configured to slide along the length of the first freezing cylinder, thus facilitating the removal of the first auger and the first driven hub from the first freezing cylinder, and wherein the second auger and the second driven hub are configured to slide along the length of the second freezing cylinder, thus facilitating the removal of the second auger and the second driven hub from the second freezing cylinder.

11. The beverage dispenser as recited in claim 10, wherein the rear end portion of the first auger includes multiple teeth extending from a wall surface of the internal cavity for engaging the first driven hub, and wherein the rear end portion of the second auger includes multiple teeth extending from a wall surface of the internal cavity for engaging the second driven hub.

12. The beverage dispenser as recited in claim 11, wherein the first driven hub defines alternating cogs and pockets along its periphery, such that the multiple teeth that extend from the wall surface of the internal cavity in the rear end portion of the first auger extend into the pockets, and wherein the second driven hub defines alternating cogs and pockets along its periphery, such that the multiple teeth that extend from the wall surface of the internal cavity in the rear end portion of second first auger extend into the pockets.

\* \* \* \* \*